Jan. 27, 1931. R. W. MUMFORD 1,790,436
RECOVERY OF CRYSTALLIZABLE CONSTITUENTS FROM LIQUORS
Original Filed Sept. 14, 1925
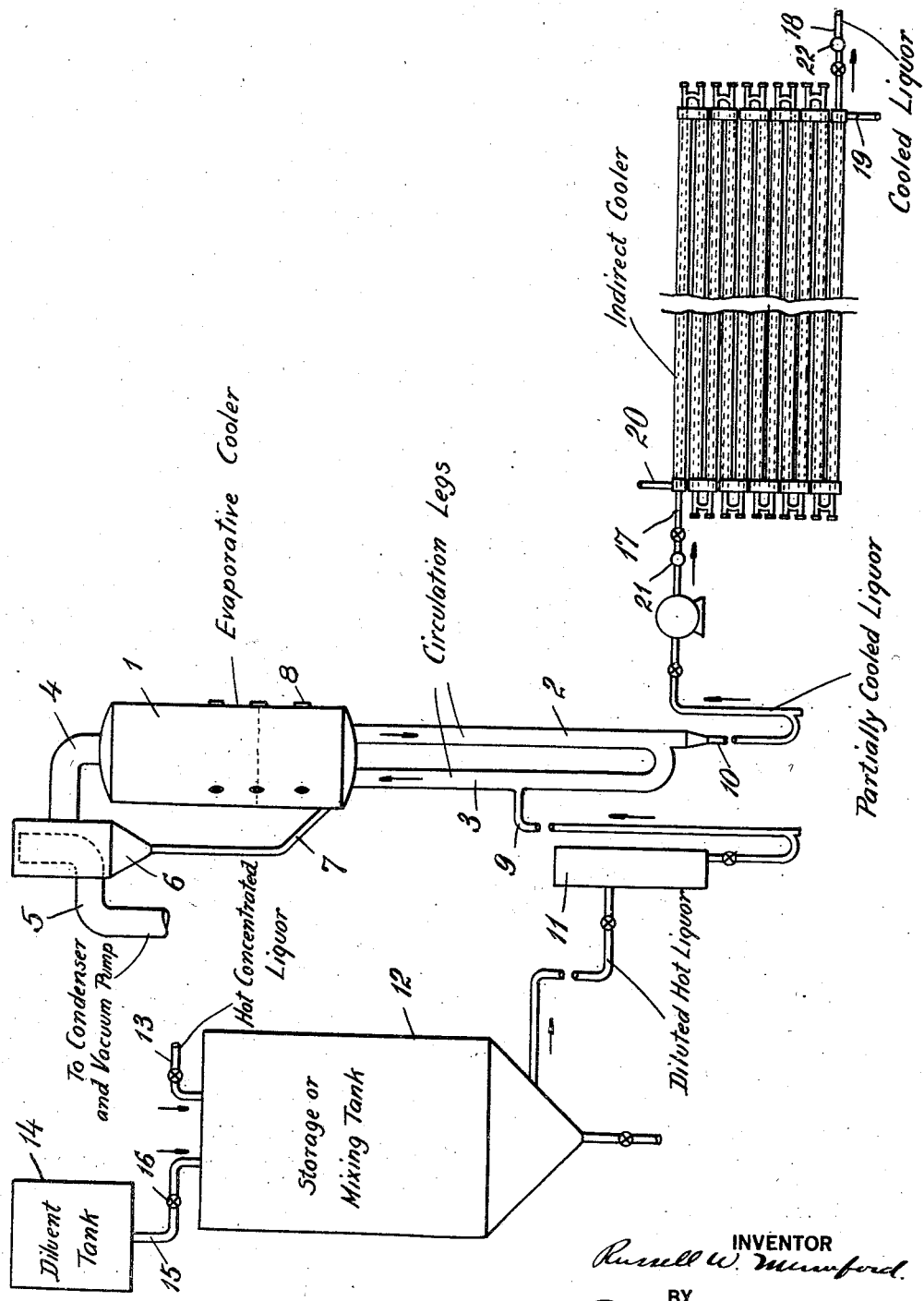
INVENTOR
Russell W. Mumford.
BY
Pennie, Davis, Marvin & Edmonds
ATTORNEYS Patented Jan. 27, 1931

1,790,436

UNITED STATES PATENT OFFICE

RUSSELL W. MUMFORD, OF TRONA, CALIFORNIA, ASSIGNOR, BY MESNE ASSIGNMENTS, TO AMERICAN POTASH & CHEMICAL CORPORATION, OF NEW YORK, N. Y., A CORPORATION OF DELAWARE

RECOVERY OF CRYSTALLIZABLE CONSTITUENTS FROM LIQUORS

Application filed September 14, 1925, Serial No. 56,121. Renewed October 4, 1930.

This invention relates to improvements in the cooling of hot liquors containing crystallizable constituents, such as salt solutions and the like, and relates particularly to the cooling of such liquors as a step in the recovery of crystallizable constituents therefrom after concentration of the liquor by evaporation at high temperature. The invention is of special value and application in connection with the recovery of potassium chloride from Searles Lake brine, and it will be described more particularly in connection therewith; but the invention in certain aspects is of more general application and has advantages in other applications as will be pointed out.

Searles Lake brine is of complex composition, and consists mainly of chlorides, sulphates, carbonates and borates of sodium and potassium. Potassium chloride can be recovered from this brine by concentrating the brine and cooling the concentrated brine. For efficient recovery of potassium chloride of a high degree of purity, the concentration is advantageously effected by evaporation at high final temperature, and the concentration is advantageously carried to saturation or near saturation with potassium chloride before the concentrated brine is cooled. On cooling, potassium chloride is precipitated because in this complex solution the solubility of the potassium chloride decreases with decreasing temperature, while the solubility of other constituents present, excepting sodium chloride and borax, normally is not substantially decreased but may even be increased. Sodium chloride and borax, however, may tend to precipitate with the potassium chloride on cooling.

If the concentration is carried to a point where the brine is substantially saturated with potassium chloride, the solubility of sodium chloride is not materially affected by cooling, but, if the concentration is stopped short of saturation with potassium chloride at the high temperature at which the evaporation operation is carried out, the solubility of sodium chloride may be decreased on cooling so that some sodium chloride will precipitate with the potassium chloride. The solubility of borax decreases along with the solubility of potassium chloride as the brine is cooled, so that, if crystallization of the borax proceeds as the brine is cooled, borax will be precipitated with potassium chloride. This will occur where the brine is cooled slowly. The brine, however, may become more supersaturated with respect to borax than with respect to potassium chloride before crystallization begins, so that by rapid cooling of the brine a separation of potassium chloride from borax can be effected as the potassium chloride will begin to crystallize first and will continue to crystallize while the borax is held in supersaturated solution.

This invention provides an improved process of cooling concentrated brines produced by evaporation of water from Searles Lake brine at high temperature, whereby the precipitation of sodium chloride and borax with the potassium chloride to be recovered from the concentrated brine is inhibited or avoided, which has several important advantages and characteristics. The invention includes the complete process as well as certain novel features of the process as applied to the treatment of brines produced by concentration of Searles Lake brine or brines of similar complex constitution. The invention also includes certain novel process features which have operating advantages and afford operating economies of more general application.

The complete process of the invention, as applied to the cooling of concentrated Searles Lake brine, comprises controlled dilution of the concentrated brine, cooling of the diluted brine to an intermediate temperature by evaporation of water therefrom under reduced pressure, and further cooling of the brine from this intermediate temperature to a lower temperature by the indirect removal of heat. The dilution is regulated to prevent precipitation of other salts, particularly sodium chloride, as the temperature of the brine is decreased. The evaporative cooling is carried to a point short of that at which borax begins to crystallize. The final cooling by indirect removal of heat is then carried to a point suitable for the maximum recovery of potassium chloride of the desired purity. The interrelation and the regulation and control of these successive operations will appear more fully as the description proceeds.

In the improved process of the invention, the initial cooling is carried out rapidly and continuously by causing evaporation of water from the brine by subjecting the hot brine to reduced pressure. For practical purposes, rapid cooling has several advantages, for example, conservation of space, time and equipment, which are of general utility. There have been proposals intended to accelerate the rate of cooling, but as applied to the cooling of concentrated salt solutions they have not been entirely satisfactory. For example, it has been proposed to employ cooling tanks fitted with extensive cooling surfaces in the shape of jackets, pipe coils or calandria of the evaporator type through which some cooling medium is passed, but, even with strong agitation of the solution being cooled, there is a tendency to heavy crystal formation on the cooling surfaces. This crystal formation impedes heat transfer and consequently retards the rate of cooling and decreases the capacity of the apparatus employed, and also necessitates frequent shut-downs for cleaning of the cooling surfaces as well as requiring the re-running of wash liquors to avoid the loss of valuable salts. It has also been proposed to effect a cooling of such solutions by evaporation under reduced pressure, but in the case of prior proposals of this nature various difficulties have been encountered due to the formation of salt crystals and to the growth of crystal deposits in and on the walls of the apparatus employed, and to clogging, particularly at the point of introduction of fresh hot solution.

According to the present invention, the advantages of direct cooling are obtained while difficulties hitherto encountered where rapid cooling has been attempted are avoided. The cleaning of cooling surfaces, and difficulties incident to the formation of crystal deposits, are eliminated, and rapid cooling with minimum requirements as to space and equipment is made possible. In carrying out the improved evaporative cooling operation of the invention, a body of the brine, or other liquor, is subjected to reduced pressure causing evaporation of liquid constituents and is cooled by the heat absorbed in the evaporation, while a stream of the liquor is circulated downwardly from the body of liquor and then upwardly back to the body of liquor, fresh hot liquor being supplied to the upwardly circulating part of the stream. The introduction of fresh hot liquor thus maintains the circulation, due to lower density of the hot liquor and to ebullition of the fresh liquor as it is introduced into the circulating stream. The cooled liquor is advantageously withdrawn from the downwardly circulating stream, but it may be withdrawn at some other point. The operation is advantageously carried out in a continuous manner with the continuous supply of fresh hot liquor and with the continuous removal of cooled liquor.

The rate of circulation of the liquor in the cooling operation may be substantially in excess of the rate at which fresh liquor is supplied and cooled liquor is withdrawn. The strong circulation of the liquor being cooled decreases any tendency of crystals formed to attach to parts of the apparatus employed, that is it tends to keep any crystals formed in suspension, and inhibits crystallization, or "salting-up," or other clogging of the cooling apparatus due to crystallization taking place during the cooling operation. In particular, the introduction of fresh hot liquor into the circulating stream of liquor undergoing cooling inhibits or avoids "salting-up" at the point of introduction of fresh hot liquor. Any crystallization that may occur does not seriously interfere with continuity of the cooling operation because the cooling is direct, that is by evaporation of liquid constituents from the liquor, and the strong circulation maintained makes it possible to keep relatively large amounts of crystallized material in suspension while the cooling operation is being carried out.

In addition to the more general advantages secured by the improved evaporative cooling operation of the invention, the invention has several special advantages in connection with the treatment of brines produced by the concentration of Searles Lake brine or similar complex brines. As has been pointed out, to promote separation of potassium chloride from borax it is desirable to cool rapidly, and it is also advantageous for the efficient recovery of potassium chloride of high purity to carry out the concentration of Searles Lake brine by evaporation at a high final temperature. Rapid cooling of large volumes of the brine over a wide temperature range by the usual methods of cooling, such as by refrigeration, requires considerable equipment and large consumption of power. Rapid cooling is, however, essential to promote separation of potassium chloride from borax and this is accomplished in an advantageous manner by the present invention. In a similar way, other hot liquors containing several crystallizable constituents, two or more of which may be of decreased solubility on cooling but one of which is capable only of a lower degree of supersaturation than the others, may advantageously be treated in accordance with the invention for separation of the constituent capable only of a low degree of supersaturation. The improved evaporative cooling operation of the invention, however, is of more general application and may be employed for cooling hot liquors either with or without concentration of the liquor that is cooled.

According to the present invention, the concentration of the brine, or other liquor being cooled caused by the evaporation taking place in the improved cooling operation of the invention may be controlled by regulated dilution of the liquor subjected to the evaporative cooling operation. In the treatment of concentrated Searles Lake brine, where the brine has been concentrated somewhat short of the point of saturation with potassium chloride, the solubility of sodium chloride as well as of potassium chloride is decreased on reduction of temperature, and the concentration of both of these constituents is increased by the removal of evaporated water. In carrying out the invention in the treatment of Searles Lake brine, accordingly, the brine is diluted, for example with water, the degree of dilution being sufficient to prevent precipitation of sodium chloride which has the greatest tendency to precipitate of the salts other than potassium chloride and borax which are present. Sufficient water is added to the brine to prevent the brine becoming concentrated to a point beyond saturation with respect to salts such as sodium carbonate, burkeite and sodium chloride, either due to the evaporation of water or to decrease in solubility on cooling. Where the brine has been concentrated approximately to saturation with potassium chloride, an amount of water about equal to that removed by evaporation during the cooling operation may with advantage be added, as in this case dilution is required only to take care of the concentration by evaporation. Where the brine has been concentrated only to a point somewhat short of saturation with potassium chloride, an excess of diluent over this amount is with advantage employed to take care of any decrease in solubility of sodium chloride.

It will be apparent that this improved control of the evaporative cooling operation provided by regulated dilution of the liquor subjected to the cooling operation, in accordance with the invention, is of general application where similar conditions are encountered. This control by dilution of the liquor makes it possible to employ evaporative cooling while regulating the concentration of the constituents present in the liquor independently of the evaporation involved. For example, in the treatment of a liquor containing several crystallizable constituents, the liquor may be cooled in accordance with the present invention by evaporation of water therefrom under reduced pressure and the precipitation of constituents other than the one first crystallizing as the temperature is reduced can be inhibited or avoided by diluting the liquor with additional liquid constituents sufficiently to maintain in solution the remaining crystallizable constituents at the lower temperature to which the brine is cooled. The amount or degree of this dilution may be either more or less than the amount removed by evaporation, and in any case whether or not and to what extent dilution is employed will depend upon the particular solubility, concentration and temperature factors. Dilution may also be employed for other purposes in connection with evaporative cooling operation with certain advantages as will be pointed out in the further description.

The improved evaporative cooling operation of the invention is of advantage particularly in higher temperature ranges, and it is of diminishing advantage as the final temperature to which the liquor is cooled therein decreases. The greater pressure reduction required for causing the necessary evaporation at lower temperature requires more expensive equipment and greater power consumption, and beyond a certain point the operation is more economically carried out by cooling with some external cooling medium, that is by indirect removal of heat and without the further removal of liquid constituents by evaporation under reduced pressure. This invention includes an improved combined cooling operation in which the liquor is first cooled to an intermediate temperature by evaporation of liquid constituents therefrom and is then further cooled by the indirect removal of heat. This combined operation has the general advantage of improved efficiency and greater economy with respect both to power and equipment while at the same time it provides for rapid cooling. The combined cooling operation of the invention has further special advantages where it is employed in the treatment of liquors containing several crystallizable constituents having solubilities decreasing on cooling but one of which constituents is capable only of a lower degree of supersaturation than the others for the separation of the constituents capable only of a lower degree of supersaturation by rapid cooling.

In the improved evaporative cooling operation of the invention, vigorous agitation is maintained both by the ebullition which takes place therein and by the circulation employed, and this agitation to a certain extent tends to prevent supersaturation of any considerable degree even where the cooling is carried out very rapidly. In the combined operation, the cooling of the liquor may be continued with the indirect removal of heat and with reduced agitation before the separation of constituents capable of a higher degree of supersaturation begins, so that separation of such constituents as are capable of a higher degree of supersaturation is further inhibited by a reduction of the agitation to which the liquor is subjected while the advantages of direct cooling are obtained over the initial range of the temperature drop. Moreover, the agitation maintained in the evaporative cooling operation tends toward the formation of relatively small crystals of constituents capable only of a low degree of supersaturation which small crystals are maintained in suspension in the partially cooled liquor as it is subjected to further cooling with indirect removal of heat. Crystallization of the constituents capable only of a low degree of supersaturation thus tends to continue upon these suspended small crystals during the latter part of the combined cooling operation which assists in reducing or avoiding deposits of the material undergoing crystallization on the walls of the apparatus employed in carrying out this latter part of the operation.

The combined cooling operation of the invention thus also provides for an improvement in the efficiency of the cooling operation carried out with indirect removal of heat even though this operation, in itself, may be carried out in any one of a number of conventional ways. The initial reduction in temperature of the liquor before it is subjected to the indirect cooling operation also assists in retarding objectionable crystal deposits in the indirect cooling operation as the temperature drop in this part of the combined operation is reduced. As ordinarily carried out, where there is a large temperature difference between the liquor and the cooling surfaces of the ordinary apparatus employed for indirect cooling, a high supersaturation results at the point of contact between the liquor and the cooling surfaces favoring the growth of crystal deposits at this point.

In the treatment of brines produced by concentration of Searles Lake brine or similar complex brines, the combined cooling operation of the invention is of special value and application. As such concentrated brines are initially cooled, they become supersaturated with potassium chloride before they become supersaturated with borax, particularly where the brine has been concentrated approximately to saturation with potassium chloride. The brine may thus be cooled in the improved evaporative cooling operation of the invention with the formation of substantial amounts of small potassium chloride crystals in suspension in the brine before the brine becomes supersaturated to any high degree with borax. The tendency of the agitation to prevent supersaturation of the brine undergoing cooling with respect to borax thus does not begin to operate until after crystallization of the potassium chloride has begun. Before crystallization of borax begins, the cooling may then be continued by the indirect removal of heat with reduced agitation and without the further removal of water. In this second part of the cooling operation, crystallization of potassium chloride will continue upon the small crystals in suspension in the brine while crystallization of borax is further retarded by carrying out this part of the operation under conditions permitting a relatively high degree of supersaturation of the brine with respect to borax. The crystallization of potassium chloride by growth upon the fine suspended crystals initially formed in the evaporated cooling operation also improves the efficiency of the indirect cooling operation and enables cooling therein to be effected at a greater rate than is possible where this crystallization tends to take place on the cooling surfaces through which heat is indirectly removed. The effectiveness of the separation of borax and potassium chloride depends in large part upon the rapidity of the cooling operation, and the combined operation is thus of special advantage in the treatment of concentrated Searles Lake brine because the combined operation provides more rapid cooling, in the indirect as well as in the direct part of the cooling operation, enabling the final cooling to be carried out with improved rapidity and efficiency and also under conditions retarding or avoiding the crystallization of borax with the potassium chloride.

The pentahydrate of borax has a greater tendency toward supersaturation than has the decahydrate and the transition point occurs at approximately 30° C. Accordingly, crystals of borax precipitated above approximately 30° C. will be precipitated as pentahydrate while those precipitated below that temperature will be decahydrate.

The invention will be further described in connection with the accompanying drawings which illustrate, in a somewhat diagrammatic and conventional manner, apparatus adapted for carrying out the practice of the invention. The apparatus illustrated for carrying out the evaporative cooling operation is described and claimed in an application filed Sept. 14, 1925, Serial No. 56,122. The apparatus illustrated for carrying out that part of the combined operation in which the removal of heat is effected indirectly is shown of conventional double tube construction, but other forms of indirect coolers may be employed for carrying out this part of the operation. It is intended and will be understood that the apparatus illustrated and particularly described is adapted for carrying out the invention but that the invention is not limited to operations carried out in such apparatus.

Referring to the drawings, the evaporative cooler comprises a vaporizing chamber or receptacle 1 provided with a pair of circulation legs, 2 and 3, consisting of a pair of vertically arranged pipes opening at their upper ends into the vaporizing chamber and connected at their lower ends. The circulation legs form with the vaporizing chamber a closed vaporizing system. The vaporizing chamber is constructed to withstand excess external pressure during the maintenance in the vaporizing chamber of a vacuum or subatmospheric pressure, and is connected through the exhaust outlet 4 and the pipe 5 to a suitable condenser and vacuum pump for the maintenance of reduced pressure therein. A trap 6 is interposed in the exhaust line for effecting the separation of any spray or foam entrained in the escaping vapors and this trap is provided with a liquid return connection 7 to the vaporizing chamber. The vaporizing chamber is provided with observation ports 8 for noting the liquid level therein and with suitable temperature and pressure indicating instruments (not shown) to assist in regulating the operation. A connection 9 is arranged for the introduction of fresh hot liquor into the circulating pipe 3 at an intermediate point, and a connection 10 is provided for withdrawing cooled liquor from the lower end of pipe 2. Fresh hot liquor is supplied from the receiving tank 11. A hot liquor storage tank discharging into the receiving tank 11 is shown at 12, hot concentrated liquor being supplied thereto, for example from a battery of multiple effect evaporators, through connection 13.

In operation of this part of the apparatus, a reduced pressure is maintained in the vaporizing chamber and fresh hot liquor is supplied to the stream of liquor circulating in the system and cooled liquor is withdrawn therefrom, a body of liquor being maintained in the vaporizing chamber to about the level indicated. Due to the lower density and the ebullition of the fresh hot liquor as it is introduced, there is a strong upward current in the circulation pipe 3 and a strong downward current in the other. The rapid circulation of the liquor past the inlet where pipe 9 connects to the circulating system in which the liquor undergoing cooling is circulating prevents crystal deposition at this point, and the vigorous circulation throughout the apparatus inhibits any clogging due to crystallization and tends to maintain any crystals formed in suspension. The cooling effected is direct, that is it is effected by the evaporation of liquid constituents from the circulating liquor and does not depend upon the removal of heat through heat-transferring surfaces, so that there is no tendency for crystal formation on cooling surfaces to impede cooling. The rapid circulation, as well as the ebullition of the liquor, and the direct cooling co-operate to make it possible to carry out the operation even where considerable crystallization occurs and where substantial amounts of crystallized constituents are maintained in suspension in the circulating liquor. The agitation due to ebullition and circulation also tends toward the formation of small crystals where crystallization occurs which assists in the maintenance of crystallized constituents in suspension. This feature of the operation is also of advantage where the production of small crystals is desired.

For carrying out dilution of the liquor subjected to evaporative cooling for controlling concentration of the liquor during the evaporative cooling, the supply receptacle 14 for a suitable diluent is arranged to discharge into the storage or mixing tank 12 through connection 15 which is provided with a control valve 16. The hot liquor supplied to the evaporative cooler may thus be diluted as desired in the tank 12 for controlling the operation. Additional liquid constituents, for example, may be supplied to the liquor to replace the liquid constituents removed during evaporation in the evaporative cooler, or the amount of dilution may be otherwise regulated to control or adjust the concentration of the liquor due to evaporation in the evaporative cooling operation as may be required in the treatment of any particular hot liquor. In some cases, for example where all of the crystallizable constituents are to be crystallized together from a liquor, dilution may not be necessary. Even in such cases, however, dilution may be employed to control or retard the rate of crystallization in the evaporative cooler, due either to the evaporation of liquid constituents or to the cooling effected, for example where the amount of constituents precipitated is inconvenient to handle in the cooler. This dilution may be made with additional liquid constituents corresponding to those present in the liquor, or it may more advantageously be effected with the cooled liquor after the removal of suspended crystallized material therefrom.

In the apparatus illustrated, a double tube cooler of conventional construction is shown for further cooling of the liquor cooled to an intermediate temperature in the evaporative cooler. This indirect cooling apparatus is made up of a series of smaller tubes arranged within larger tubes, some external medium being circulated through the larger tubes about the inner tubes and the liquor to be cooled being circulated through the inner tubes, heat transfer being effected through the walls of the smaller tubes. The liquor is supplied to this indirect cooler from the evaporative cooler through connections 10 and 17 and the cold liquor is discharged therefrom through connection 18. The cooling medium employed, for example, may be refrigerated brine, and is supplied to the indirect cooler through connection 19 and is withdrawn through connection 20. To provide for continuous operation, a number of indirect coolers may be arranged between headers 21 and 22 so that one or more of them may be cut out for cleaning as necessary or desirable while others remain in operation. In the indirect coolers, there is no further removal of liquid constituents and consequently no further concentration due to the removal of liquid constituents and the liquor undergoing cooling therein is not subjected to agitation as vigorous as that maintained in the evaporative cooler. The agitation is reduced both because there is no ebullition of the liquor and because the flow of the liquor through the cooler is the only circulation maintained, there being no excess circulation such as is maintained in the closed cycle provided in the evaporative cooling apparatus shown.

In the treatment of liquors containing constituents capable of a relatively high degree of supersaturation, the liquor may thus be further cooled while crystallization of such constituents is nevertheless inhibited though the degree of supersaturation is increased by the cooling. Moreover, as combined in operation with the evaporative cooler, where crystallization of constituents capable only of a lower degree of supersaturation is begun in the evaporative cooler, crystallization in the indirect cooler will continue by growth upon the fine crystals in suspension in the liquor as the liquor is indirectly cooled reducing or avoiding the formation of crystal deposits on the walls of the tubes through which the liquor is circulated in the indirect cooler. This enables the indirect cooling operation to be carried out more efficiently and also at a greater rate while avoiding difficulties due to crystallization, as such indirect methods have previously been practiced, particularly where attempts have been made to carry out rapid cooling in this manner.

In carrying out the invention in connection with the treatment of Searles Lake brine for the recovery of potassium chloride therefrom, the brine is concentrated in evaporators and supplied to the mixing tank 12 through connection 13. In an application filed February 6, 1924, Serial No. 690,946, there is described an improved method of recovering potassium chloride from Searles Lake brine, and similar brines, in which the brine is concentrated by evaporation at progressively higher temperatures, the temperature of evaporation being progressively increased before the precipitation of glaserite begins at the prevailing temperature and concentration, until the brine is saturated or nearly saturated with potassium chloride. Glaserite is a double sulphate of sodium and potassium and its precipitation is objectionable in that it constitutes a loss of potash. For example, in carrying out this improved process, the brine may be concentrated in triple effect evaporators successively at temperatures of about 57° C., 80° C., and finally 110° C., being brought approximately to saturation with potassium chloride at the highest temperature. During the evaporation, sodium chloride, burkeite and sodium carbonate are precipitated, and as concentration, that is water removal, is continued this precipitation continues.

Accordingly, in carrying out this invention, the brine is brought to approximate saturation with potassium chloride in the high temperature evaporation and sufficient additional water is added to the hot concentrated brine supplied to the evaporative cooling operation to replace the water to be evaporated in the cooling operation so that the concentration of the cooled liquor with respect to salts such as sodium chloride, burkeite and sodium carbonate, will not be substantially above that of the hot concentrated liquor as obtained from the evaporators. Contamination of the potassium chloride with salts such as sodium chloride, burkeite or sodium carbonate due to removal of water during the evaporative cooling operation is thus avoided. Where the brine is not concentrated to saturation with potassium chloride before cooling is begun, additional water is supplied to prevent contamination of the potassium chloride with sodium chloride due to decrease of the sodium chloride solubility on cooling. The solubility of sodium carbonate and sodium sulphate in this complex brine increases on cooling, so that as far as these salts are concerned the amount of water necessary to be supplied to prevent precipitation on cooling might be less than that removed during the evaporative cooling operation. Enough water must be present, however, during and after the evaporative cooling operation to keep salts other than potassium chloride, excepting in this respect borax, in solution. The hot storage tank 12, which may be insulated, is provided to hold the concentrated brine from the high temperature evaporators until it is ready to be supplied to the evaporative cooler to prevent premature crystallization. The proper dilution of the concentrated brine may be effected by the controlled addition of water, or of wash liquors high in potassium chloride, to the brine in the storage tank.

The diluted hot brine is then introduced into the brine circulating in the evaporative cooler at a point where it is flowing upwardly. In the evaporative cooler, a vacuum or subatmospheric pressure is maintained such that rapid evaporation takes place and the brine is cooled rapidly by the absorption of heat in the evaporation. This rapid cooling assists in promoting a separation of potassium chloride from borax, which is also present in the brine and which also has a solubility decreasing on cooling, because the borax is capable of a higher degree of supersaturation so that with rapid cooling the crystallization of borax does not begin as soon as the crystallization of potassium chloride which is capable only of a relatively lower degree of supersaturation. The separation that can be effected is increased by increasing the rate of cooling. In the evaporative cooler, however, vigorous agitation is maintained and this tends to prevent supersaturation of the brine with any of the salts present. In treating concentrated Searles Lake brine according to the present invention, however, during the initial stage of cooling the brine is not saturated with respect to borax so that the crystallization of potassium chloride may be begun before the brine becomes saturated with respect to borax. The vigorous agitation causes the potassium chloride to be crystallized in the form of fine crystals which are maintained in suspension, and by employing direct cooling, the cooling may be nevertheless carried out rapidly as the surface of the brine undergoing evaporation is continuously replaced and as heat transfer through walls of the apparatus is not relied on. After the brine reaches saturation with borax, the greatest yield of potassium chloride of highest purity is obtained by decreasing the temperature as rapidly as possible under conditions inhibiting the beginning of crystallization of borax.

Accordingly, before the crystallization of borax begins the partially cooled brine is transferred from the evaporative cooler to the indirect cooler where the cooling is continued but under conditions of reduced agitation such that the crystallization of borax from the brine now supersaturated with borax is further inhibited. In the indirect cooler, the crystallization of potassium chloride continues, but, due to the presence of the fine potassium chloride crystals initially formed in the evaporative cooler and maintained in suspension in the liquor, crystallization of potassium chloride tends to continue upon these suspended crystals so that crystal deposits on the heat-transferring surfaces of the indirect cooler form relatively slowly even though high rates of cooling are used. There is also a reduced tendency toward the deposition of potassium chloride crystals on the heat-transferring surfaces of the indirect cooler as the brine is less supersaturated with potassium chloride since the crystallization of this salt is begun in the evaporative cooling operation. In the combined operation, in the treatment of concentrated Searles Lake brine, the hot brine may, for example, be cooled from about 110° C. to a temperature in the neighborhood of, say, 60° C. or somewhat more in the evaporative cooler and then further cooled to a temperature in the neighborhood of, say, 30° C. without the further removal of water by indirect heat exchange in coolers of conventional construction. The crystallized potassium chloride is then separated from the brine before the borax begins to crystallize.

Crystal deposits formed in the indirect cooling apparatus consist essentially of potassium chloride so that the wash liquors produced in washing these coolers with water are solution containing principally dissolved potassium chloride. Such wash liquors may with advantage be employed for diluting the hot brine supplied to the evaporative cooling operation. Normally, the amount of such wash liquors is less than sufficient to provide the water required for dilution so that all wash liquors can be re-run in this way without imposing any additional load on the evaporators and without requiring additional equipment and additional power consumption. Likewise, in other operations, wash liquors containing dissolved constituents of the hot liquor to be cooled may be employed for dilution where the addition of such liquors does not increase the concentration of crystallizable constituents present other than those it may be desired to separate beyond the point of saturation.

It will thus be seen that the present invention provides improvements having important advantages in the recovery of a high yield of potassium chloride of high purity from Searles Lake brine or similar complex brines.

The invention provides an improved operation for the separation of potassium chloride from borax, in which the potassium chloride is crystallized by rapid cooling, whereby the precipitation of borax is inhibited as the brine can become more highly saturated with respect to borax than with respect to potassium chloride before crystallization begins, and in which the cooling is carried out under conditions inhibiting to a maximum extent the beginning of the crystallization of borax. This operation includes cooling to an intermediate temperature by evaporation of water from the brine with vigorous agitation, during which cooling potassium chloride begins to crystallize in fine suspended crystals, followed by indirect cooling without the further removal of water and with reduced agitation, in which operation the crystallization of potassium chloride continues upon the fine suspended crystals and in which the crystallization of borax is further inhibited due to the reduced conditions of agitation maintained. It will be apparent that this operation is also useful in the treatment of other brines or liquors containing several constituents some of which are capable of a higher degree of supersaturation than others for the separation of the constituents capable only of a lower degree of supersaturation.

The invention also provides an improved operation for cooling concentrated Searles Lake brine while preventing the separation of sodium chloride or burkeite or sodium carbonate with the potassium chloride.

In the treatment of Searles Lake brine, it is desirable to avoid contamination of the potassium chloride with both sodium chloride and borax, as well as other salts present, and this invention provides an improved combined operation adapted to inhibit or avoid precipitation of sodium chloride or borax or such other salts with the potassium chloride recovered and to promote the recovery of a high yield of potassium chloride of high purity.

One of the important advantages of the invention is the reduction in the amount of wash liquors necessary to be handled that it makes possible and the improved method of handling such wash liquors that it provides. In the separation of potassium chloride and borax from brines containing both of them, the yield of potassium chloride that can be recovered by ordinary methods before borax begins to crystallize is usually insufficient for commercial purposes and it is necessary to continue the crystallization of potassium chloride even after borax begins to crystallize so that the potassium chloride product recovered is contaminated with borax. The removal of this borax necessitates the use of large volumes of wash liquors which in turn must be further treated for the recovery of the valuable salts they contain. This necessitates additional equipment and the further consumption of power, both for handling and for evaporation, so that by avoiding or reducing the use of wash liquors, the present invention provides important economies of operation. Moreover, the invention provides, in certain cases as in the treatment of Searles Lake brine, an improved method of treating such wash liquors to recover the valuable constituents they contain. These economies can also be secured by employing these features of the invention in connection with other operations for the separation of similar crystallizable constituents from liquors containing such constituents together.

In its broader aspects, the invention provides several features of operation which are of more general application. For example, the improved evaporative cooling operation of the invention is applicable to the cooling of concentrated salt solutions for crystallizing out salts where the crystallization may be in whole or in part effected in the improved evaporative cooling operation. Where a single salt is to be crystallized from a solution in which it occurs alone or where several crystallizable constituents are to be removed together from a liquor, the liquor may be concentrated as well as cooled in the evaporative cooling operation. Final concentration of liquors containing crystallizable constituents may also be carried out in the evaporative cooling operation in other cases where the combined result of the evaporation and cooling does not carry the concentration of constituents other than those it is desired to separate beyond saturation. Where concurrent evaporation and cooling do not cause the precipitation of constituents other than those it is desired to separate, the evaporation of liquid constituents may be carried to a point beyond saturation of the liquor with the constituents it is desired to precipitate, and the invention is of particular value in this connection in that it enables the cooling operation to be continued during crystallization and while crystals are in suspension in the circulating liquor. The invention also provides for control of the concentration effected in the evaporative cooling where this is desirable to prevent the precipitation of one or more of the crystallizable constituents present, and also makes it possible to employ evaporative cooling to cool liquors without concentrating them. Where constituents are present the solubility of which decreases on cooling, the liquor may be diluted sufficiently to prevent the precipitation of these constituents. Likewise, where it is desirable for any reason to carry out the crystallization over a lower temperature range, dilution of the liquor may be employed to retard the crystallization until the liquor has been cooled to the desired temperature. In some cases, it may also be desirable to retard the rate of crystallization where crystallization is carried out in the evaporative cooling operation and here also dilution of the liquor may be employed to control the rate of crystallization. Where the entire cooling is effected in the evaporative cooling operation, extraneous refrigeration or cooling equipment and additional operations incidental thereto are eliminated, and, in connection with operations where liquors are further cooled after discharge from the evaporative cooler, the amount of power and extraneous equipment required for effecting the complete cooling desired is materially reduced. In the combined operation, moreover, the efficiency and capacity of the indirect cooling operation are increased as has been pointed out.

I claim:

1. An improved method of cooling hot liquors containing a plurality of crystallizable constituents, two of said constituents having solubilities decreasing on cooling one of which is capable of a higher degree of supersaturation than the other, which comprises cooling the liquor rapidly by evaporating liquid constituents therefrom while maintaining vigorous agitation, whereby small crystals of the constituent capable only of a lower degree of supersaturation are formed while crystallization of the constituent capable of a higher degree of supersaturation is inhibited, and before crystallization of the constituents capable of a higher degree of supersaturation begins continuing the cooling with reduced agitation and with indirect removal of heat, whereby crystallization of the constituent capable only of a lower degree of supersaturation continues upon the small crystals initially formed while crystallization of the constituent capable of a higher degree of supersaturation is further inhibited.

2. An improved method of cooling hot liquors containing a plurality of crystallizable constituents, one of said constituents being capable of but a relatively low degree of supersaturation, the liquor also containing constituents capable of a higher degree of supersaturation, which comprises diluting the liquor with additional quantities of liquid constituents and thereafter cooling the liquor by evaporating liquid constituents therefrom while maintaining vigorous agitation, and before crystallization of constituents capable of a relatively high degree of supersaturation begins continuing the cooling with reduced agitation and with indirect removal of heat.

3. An improved method of cooling hot concentrated brines containing chlorides, borates, sulphates and carbonates of sodium and potassium, which comprises diluting the brine and cooling the diluted brine by evaporation of water therefrom while maintaining vigorous agitation, whereby small crystals of potassium chloride are formed while crystallization of borax is inhibited, the degree of dilution being sufficient to prevent the crystallization of sodium chloride during cooling, and before crystallization of borax begins continuing the cooling with reduced agitation and with indirect removal of heat, whereby crystallization of potassium chloride continues upon the small crystals initially formed while crystallization of borax is further inhibited.

4. An improvement in the recovery of potassium chloride from Searles Lake brine, where the brine is concentrated by evaporation at high temperature, which comprises diluting the brine and cooling the diluted brine by evaporation of water therefrom under reduced pressure while maintaining vigorous agitation, whereby small crystals of potassium chloride are formed while crystallization of borax is inhibited, the degree of dilution being sufficient to prevent the crystallization of sodium chloride on cooling, and before crystallization of borax begins continuing the cooling with reduced agitation and with indirect removal of heat, whereby crystallization of potassium chloride continues upon the small crystals initially formed while crystallization of borax is further inhibited.

5. An improved method of cooling hot concentrated brines containing borates and chlorides of sodium and potassium, which comprises cooling the brine by evaporation of water therefrom while maintaining vigorous agitation and before the crystallization of borax begins continuing the cooling of the brine by indirect removal of heat with reduced agitation.

6. An improvement in the recovery of potassium chloride from Searles Lake brine, where the brine is concentrated by evaporation at high final temperature, which comprises cooling the hot brine by evaporation of water therefrom under reduced pressure while maintaining vigorous agitation, and before crystallization of borax begins continuing the cooling with reduced agitation and with indirect removal of heat.

7. An improved method of cooling hot concentrated brines containing chlorides, borates, sulphates and carbonates of sodium and potassium, which comprises cooling the hot brine by evaporation of water therefrom while maintaining vigorous agitation, whereby small crystals of potassium chloride are formed while crystallization of borax is inhibited, and before crystallization of borax begins continuing the cooling with reduced agitation and with indirect removal of heat.

8. An improved method of cooling hot concentrated brines containing chlorides, borates, sulphates and carbonates of sodium and potassium, which comprises initially cooling the brine with vigorous agitation and with the formation of small crystals of potassium chloride, and thereafter continuing the cooling with reduced agitation whereby crystallization of potassium chloride continues upon the small crystals initially formed while the crystallization of borax is inhibited.

9. A process of cooling brine containing a plurality of crystallizable constituents, two of said constituents having solubilities decreasing on cooling, one of which is capable of a higher degree of supersaturation than the other, which comprises subjecting the brine to an initial stage of evaporative cooling to reduce the temperature to nearly the saturation point with respect to the constituent capable of a higher degree of supersaturation, while precipitating the other constituents, and then subjecting the brine to rapid cooling while further precipitating said latter constituent and maintaining the other constituent in a state of supersaturation.

10. A process of cooling brine containing a plurality of crystallizable constituents, two of said constituents having solubilities decreasing on cooling, one of which is capable of a higher degree of supersaturation than the other, said constituent having two hydrated forms, one of which possesses a higher tendency towards supersaturation than the other, which comprises subjecting the brine to an initial stage of evaporative cooling to reduce the temperature to nearly the saturation point with respect to the constituent having a higher degree of saturation, while precipitating the other constituent, and then subjecting the brine to rapid cooling to nearly the transition temperature of the hydrates of the constituent having the higher degree of saturation, while further precipitating the other constituent, and maintaining the first constituent in a state of supersaturation.

11. A process of cooling brine to precipitate potash, the brine containing borax and being hot and substantially saturated with respect to potash, which comprises subjecting the brine to an initial stage of evaporative cooling to reduce the temperature to nearly the saturation point with respect to borax, while precipitating potash, and then subjecting the brine to rapid cooling to nearly the transition temperature between the pentahydrate of borax and the decahydrate of borax, while further precipitating potash and maintaining the borax in supersaturation.

12. A process of cooling brine to precipitate potash, the brine containing borax and being hot and substantially saturated with respect to potash, which comprises subjecting the brine to an initial stage of evaporative cooling to reduce the temperature to nearly the saturation point with respect to borax, while precipitating potash, and while forcibly circulating brine from the evaporative zone to a mixing zone and back into said zone, introducing the fresh brine in said mixing zone, and then subjecting the brine to rapid cooling to nearly the transition temperature between pentahydrate of borax and the decahydrate of borax, while further precipitating potash and maintaining the borax in supersaturation.

13. A process of cooling brine to precipitate potash, the brine containing borax and being hot and substantially saturated with respect to potash, which comprises subjecting the brine to an initial stage of evaporative cooling in which the fresh brine is continuously added and mixed with the cooled brine circulated from and to the evaporative zone, and then subjecting the brine to rapid cooling materially below the saturation point of the brine with respect to borax, while further precipitating potash and maintaining the borax in supersaturation.

14. A process of cooling brine containing a plurality of crystallizable constituents having a decrease in solubility on cooling, one of said constituents having a higher tendency toward supersaturation than the other, which comprises subjecting the brine to an initial stage of evaporative cooling to reduce the temperature to nearly the saturation point with respect to the constituent having the higher tendency towards supersaturation, while continuously adding fresh hot brine to the cooled brine circulated from the evaporative zone and back to said evaporative zone, and then subjecting the brine to a second stage of rapid cooling materially below the saturation point of the brine with respect to the constituent having the higher tendency towards supersaturation, while further precipitating the other constituent.

15. A process of cooling hot concentrated brines containing potash and borates, which comprises initially cooling the brine while rapidly commingling fresh brine with the cooled brine which is circulated from the evaporative zone, with the formation of crystals of potassium chloride, and thereafter continuing cooling the brine in the presence of potassium crystals from the first cooling operation while inhibiting the crystallization of borax.

In testimony whereof I affix my signature.
RUSSELL W. MUMFORD.